US006856990B2

(12) United States Patent
Barile et al.

(10) Patent No.: US 6,856,990 B2
(45) Date of Patent: Feb. 15, 2005

(54) NETWORK DEDICATION SYSTEM

(75) Inventors: Steven E. Barile, Portland, OR (US); Bradford H. Needham, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 336 days.

(21) Appl. No.: 09/829,600

(22) Filed: Apr. 9, 2001

(65) Prior Publication Data

US 2002/0147699 A1 Oct. 10, 2002

(51) Int. Cl.[7] ................................................ G06F 17/30
(52) U.S. Cl. ........................................... 707/10; 707/1
(58) Field of Search ............................... 707/1–2, 9–10

(56) References Cited

U.S. PATENT DOCUMENTS

| | | | | |
|---|---|---|---|---|
| 5,577,266 | A | * | 11/1996 | Takahisa et al. .............. 455/66 |
| 6,496,851 | B1 | * | 12/2002 | Morris et al. ................ 709/204 |
| 6,539,354 | B1 | * | 3/2003 | Sutton et al. ................ 704/260 |
| 6,581,103 | B1 | * | 6/2003 | Dengler ..................... 709/231 |
| 2002/0032752 | A1 | * | 3/2002 | Gold et al. .................. 709/218 |

* cited by examiner

Primary Examiner—Safet Metjahic
Assistant Examiner—Haythim ALaubaidi
(74) Attorney, Agent, or Firm—Steven P. Skabrat

(57) ABSTRACT

A method includes receiving a dedication from a first user via a network and applying the dedication to a play list of a second user.

2 Claims, 1 Drawing Sheet

US 6,856,990 B2

NETWORK DEDICATION SYSTEM

BACKGROUND

1. Field

The present invention relates generally to rendering media content on a computer system, and, more specifically, to providing dedications by way of a network.

2. Description

The use of media player applications for personal computers (PCs) and other digital devices has become widespread. Many different player applications are offered by software developers. The player applications are typically available for download from a network such as the Internet, often at no cost. One widely used player application is an audio player that renders digital audio files for listening by a user. Several different digital audio data formats are in common use, with the most common being the Motion Picture Expert Group (MPEG) audio layer 3 or "MP3" format. When digital audio data is stored in a file in the well-known MP3 format, the file may be easily moved, copied, transferred, or rendered by operating system or player application software. Of course, media player applications may also render video and other forms of content as well. While the discussion of media players herein may in some cases specify audio players, it should be appreciated that the topics may apply to video and other forms of media content as well.

Users are experienced in using audio player applications to build play lists of their favorite music. Play lists are a feature of many of the available audio player applications. A user typically constructs a play list of multiple units of audio content (e.g., music files) obtained from a variety of sources. Collectively, the content of the play list may be referred to as a "program". The individual units of content which make up the play list may be referred to as "segments" of the play list.

When the audio player application is operating according to a play list, the user may experience a successive stream of songs listed in the play list. However, once the user initiates operation of the audio player according to the play list, manual intervention by the user may be involved in order to interleave additional content with the content specified in the play list. There is typically no convenient manner by which another person may modify the user's play list, for example, to interleave a dedication. As used herein, "dedication" refers to any media content specified by a party other than the user experiencing the content. In one sense, network-based dedications are similar to the familiar radio dedications in which a friend or family member contacts the radio station and requests that a particular song "go out to X", where X is a listener of the radio station.

Thus, there are opportunities for providing additional capabilities in digital audio applications that overcome these and other limitations of the prior art.

BRIEF DESCRIPTION OF THE DRAWINGS

The features and advantages of the present invention will become apparent from the following detailed description of the present invention in which.

DETAILED DESCRIPTION

An embodiment of the present invention is a method and apparatus for providing dedications to a user over a network. The present invention provides a technique for insertion of dedication content between segments of an audio and/or video (henceforth "media") program. According the present invention, when a user is listening to a series of digital media files being rendered by a media player application according to a play list or in a streaming manner, additional information may be rendered for the user in between the media files (e.g., in between songs for audio media) or even as a "voice over" during media rendering. The additional information may be specified by another person. If some of the additional information is specified in a textual format (e.g., ASCII), the text may be converted into audio for audible rendering to the user.

In one embodiment, a user may be executing an audio player application to play either locally stored digital audio files (e.g., files in MP3 or another audio format) or other streaming digital audio files (as in an Internet radio application). In embodiments of the present invention, the system plays a message and a song dedication to the user in between songs or as a voice-over during a song of the play list. Other information may also be rendered between songs or as voice overs.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Figure 1:
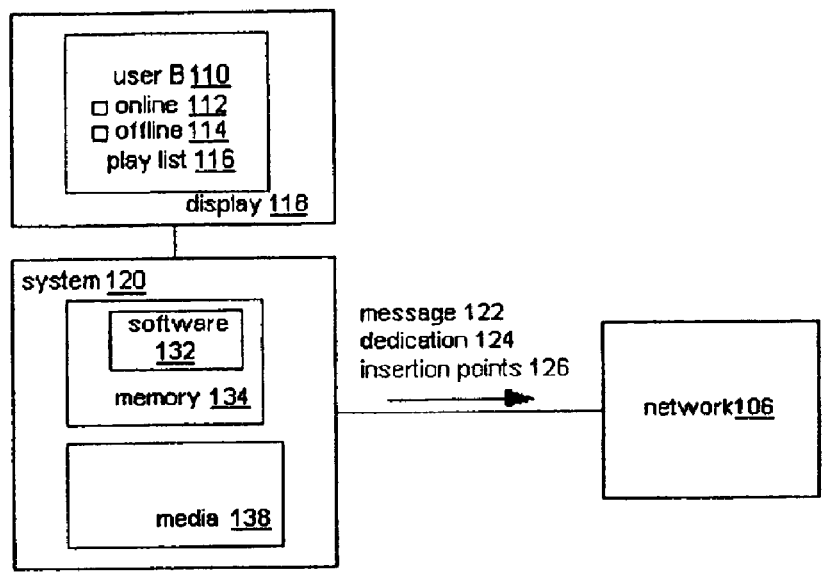
FIG. 1 shows an embodiment of a system according to the present invention.

FIG. 1 is a diagram of a system 100 according to an embodiment of the present invention. System 100 includes a computer system 120 for accessing the network 106. A computer system is any device comprising a processor and memory, the memory to store instructions and data which may be input to the processor. In one embodiment, the computer system 120 comprises at least one of a PC, an Internet or network appliance, a set-top box, a handheld computer, a personal digital assistant, a personal and portable audio device, a cellular telephone, or other processing device. Network 106 may be any network or series of interconnected networks capable of transporting digital content. For example, network 106 may be a local area network (LAN), a wide area network (WAN), the Internet, a terrestrial broadcast network such as a satellite communications network, or a wireless network. A network interface (not shown) may couple to the computer system 120 and network 106.

The computer system 120 comprises a memory 134. The memory 134 may be any machine-readable media technology, such as Random Access Memory (RAM), Dynamic RAM (DRAM), Read-Only Memory (ROM), flash, cache, and so on. Memory 134 may store instructions and/or data represented by data signals that may be executed by a processor of the computer system 120 (processor not shown). The instructions and/or data may comprise software for performing techniques of the present invention. Memory 134 may also contain additional software and/or data (not shown).

In one embodiment, a display device 118 may be coupled to the computer system 120. The display device receives data signals from the computer system 120 and displays information contained in the data signals to a user of system 120. In one embodiment, computer system 120 may also comprise a machine-readable storage media 134 which acts as a memory to store instructions and data (including possibly media content), but typically comprises higher capacity and slower access speeds than does memory 134.

Computer system 120 may receive from network information about the play list 116 of another user of another computer system (henceforth user B). In one embodiment, this information may include 1) information 116 about user B's play list, 2) an identification 110 of user B, and 3) information about whether user B is online 112 or offline 114. "Online" means that user B is currently capable of receiving signals from the network 106. A representation of this information, or portions thereof, may be displayed on display 118.

By interacting with software 132, user A may generate a message 122 to be transmitted to a computer system of user B. This message 122 may include any content, such as a greeting, a reminder, a letter, a statement of good wishes, and so on. The message 122 may take any form, including ASCII text, audio data recorded from a microphone, a video segment (with or without audio), and so on. User A may also select a dedication 124 for user B. This dedication 124 identifies media content to be experienced by user B. User A may identify one or more insertion points 126 for the message 122 and the dedication 124 in user B's play list 116. In one embodiment, both user A and user B on online when the dedication is made, and play list 116 is the play list which user B is currently experiencing.

The message 122 and dedication 124 may be inserted together before or after a segment of the play list 116, or in different locations in the play list 116. The dedication 124 may identify a segment in user B's play list 116, or media content from elsewhere. The media content identified by the dedication 124 may be stored locally to the computer system of user B, or stored by a device of the network 106. Of course, the dedication 124 may comprise more than a mere identification; it may also comprise the actual media content for user B to experience as well. The message 122, dedication 124, and insertion points 126 may be transmitted from the computer system 120 to the network 106. When user B is online, the message 122, dedication 124, and insertion points 126 may be received by a computer system of user B shortly after being transmitted. Alternately, the message 122, dedication 124, and insertion points 126 may be stored by storage of the network 106 for later access by user B.

Figure 2:
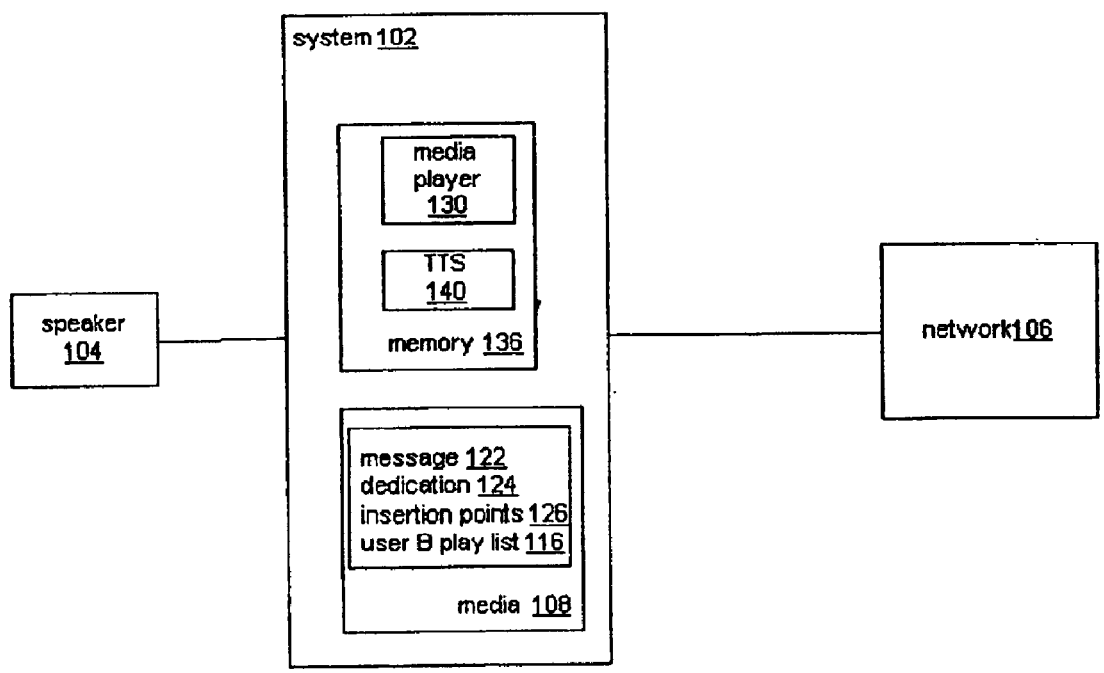
FIG. 2 shows an embodiment of a system according to the present invention.

FIG. 2 shows an embodiment 200 of a system in accordance with the present invention. A computer system 102 of user B may receive from the network 106 the message 122, dedication 124, and insertion points 126. These may be stored, along with user B's play list 116, on a machine-readable storage media 108, such as a hard drive, solid-state memory, CD ROM, and so on. Of course, the play list 116, message 122, dedication 124, and insertion points 126 may also be stored by storage of the network 106, in which case user B may need to be online in order to experience the dedication, in a manner to be described.

The computer system 102 may comprise a memory 136. The memory 136 may be any machine-readable media technology, such as Random Access Memory (RAM), Dynamic RAM (DRAM), Read-Only Memory (ROM), flash, cache, and so on. Memory 136 may store instructions and/or data represented by signals that may be executed by a processor of the computer system 102 (processor not shown). The instructions and/or data may comprise software for performing techniques of the present invention. Memory 136 may also comprise additional software and/or data (not shown). In one embodiment, computer system 102 may also comprise a machine-readable storage media 108 which acts as a memory to store instructions and data (including possibly media content), but typically comprises higher capacity and slower access speeds than does memory 136. In one embodiment, the storage media 108 may comprise user B's play list 116, the message 122, the dedication 124, and the insertion points 126.

The computer system 102 may further comprise a speaker device 104 for rendering audio media content. Of course, the computer system might comprise multiple speaker devices, and/or a display device for rendering video media content. In one embodiment, the computer system 102 comprises at least one of a PC, an Internet or network appliance, a set-top box, a handheld computer, a personal digital assistant, a personal and portable audio device, a cellular telephone, or other processing device. The computer system 102 in one embodiment may be a consumer electronics device such as a home stereo or portable MP3 player. In one embodiment, the computer system 102 may be coupled to the network 106 by a home network.

Memory 136 may comprise media player software 130. Media player 130 may receive and process media content for rendering. In one embodiment, the media player 130 may be an audio player such as Windows Media Player (available from Microsoft Corporation), RealPlayer (available from RealNetworks, Inc.), or WinAmp (available from NullSoft Corporation), for example. In another embodiment, the media player 130 may be an application program or software plug-in that supports reception and rendering of media content streams from the network 106. In another embodiment, the functionality of the media player 130 may be included in a browser program (such as Internet Explorer from Microsoft Corporation or Netscape Navigator (not shown)).

In one embodiment, the memory 136 may comprise Text-To-Speech software (TTS) 140 for converting text content into audio. For media content comprising a textual format (for example, ASCII), the TTS software 140 may convert the text into an audio media format recognizable as speech according to well-known methods. Such media content may be rendered by speaker 104. In one embodiment, the TTS software 140 operates on media content according to a speech application programming interface (SAPI). In other embodiments, the TTS software 140 may be comprised by a server computer system (not shown) of the network 106, and the converted audio media content may be transmitted over the network 106 to the computer system 102.

The media player 130 may receive media content in accordance with the play list 116 from storage media 108, or from the network 106. In accordance with the play list 116, the media player 130 may transfer audio media content to the speaker 104 for rendering.

In one embodiment, media content of the play list is stored locally by the computer system 102 by storage media 108. Of course, the local storage media 108 could also be external to the computer system 108, or be part of a home network or other local computing or media processing environment. For example, a user may have converted tracks from multiple compact discs (CDs) in the user's music collection from CD format to MP3 format (or other suitable digital audio format) and stored the MP3 files in the local storage. The play list 116, dedication 124, message 122, and insertion points 126 may be stored locally or on storage of the network 106.

When the media player 130 encounters a segment corresponding to one of the insertion points 126, the message 122 may be rendered. If the message 122 is stored in a textual form, it may be converted to audio by the TTS software 140. In one embodiment where the message 122 and dedication 124 are inserted together, the dedication 124 may also be rendered. The dedication 124 may comprise the actual media content to render, or an identification of the media unit (e.g., Uniform Resource Locator, local file descriptor, or other pointer to a song file or other media source) comprising the dedication content. The dedication 124 may identify a segment of the play list 116 or content from another source.

Alternatively, the dedication 124 and the message 122 may be inserted at different points in the play list 116. Consider the following exemplary dedication: a message 122 comprising the text "Hello John. Good to see you back online. This one's for you—remember September in Vegas?", and a dedication 124 identifying a song stored in an MPEG formatted media file with the URL http://www.musicland.com/john/blackjack.mp. The insertion points 116 for both the message 122 and the dedication 124 could be between segments one and two of John's play list 116. When the media player 130 finishes segment one of the play list 116, the message 122 could be converted to audio using the TTS software 140 and rendered on the speaker 104. John would then hear the spoken words, "Hello John. Good to see you back online. This one's for you—remember September in Vegas?" Next, the media player 130 would attempt to receive an audio stream in well known manners from the network source http://www.musicland.com/john/blackjack.mp, e.g. the song "Blackjack", and render it on the speaker 104. Of course, John would need to be online to receive the song. When the dedication 124 specifies content local to system 102, John may experience the dedication content without being online.

In one embodiment, rather than rendering the message 122 between segments of the play list 116, the message audio may be mixed with the audio of a media segment so as to provide a "voice over." In this case, the user who made the dedication may specify that the message should be applied as a voice over.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Although some operations of the present invention (for example, TTS) are described in terms of a hardware embodiment, embodiments of the present invention may be implemented in hardware or software or firmware, or a combination thereof. Embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system embodying the playback device components includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a removable storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of creating a song dedication from a first computer user to a second computer user comprising:

obtaining, by the first computer user, a play list for a media player application of a second computer user's computer system;

generating an audio message file containing a message from the first computer user to the second computer user;

selecting a dedication song file;

selecting an insertion point in the second computer user's play list;

inserting references to the audio message file and the dedication song file Into the second computer user's play list without interaction by the second computer user;

transmitting the second computer user's play list to the second computer user's computer system only when the second computer user is currently on-line; and automatically processing the play list by the media player application and rendering the audio message file and the dedication song file for perception by the second computer user without interaction by the second computer user.

2. The method of claim 1, wherein the audio message file is rend red as a voice over concurrently with rendering the dedication song file.

* * * * *